(12) United States Patent
Yoshida

(10) Patent No.: US 8,517,721 B2
(45) Date of Patent: Aug. 27, 2013

(54) BURNER FOR FABRICATING OPTICAL FIBER PREFORM

(75) Inventor: Makoto Yoshida, Kamisu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 623 days.

(21) Appl. No.: 12/395,061

(22) Filed: Feb. 27, 2009

(65) Prior Publication Data

US 2009/0214998 A1 Aug. 27, 2009

(30) Foreign Application Priority Data

Feb. 27, 2008 (JP) .................................. 2008-046851
Feb. 10, 2009 (JP) .................................. 2009-028656

(51) Int. Cl.
*C03B 37/12* (2006.01)

(52) U.S. Cl.
USPC ............ 431/350; 431/351; 431/352; 431/353; 431/354; 65/355; 65/356; 65/413; 65/531

(58) Field of Classification Search
USPC ............ 431/350, 351, 352, 353, 354; 65/355, 65/356, 413, 531
See application file for complete search history.

(56) References Cited

U.S. PATENT DOCUMENTS

| | | | | |
|---|---|---|---|---|
| 3,674,213 | A | * | 7/1972 | Le Mounier .................. 239/425 |
| 4,388,098 | A | * | 6/1983 | Takahashi et al. ............... 65/157 |
| 4,801,322 | A | * | 1/1989 | Suda et al. ...................... 65/144 |
| 4,810,189 | A | | 3/1989 | Mikami et al. |
| 5,360,171 | A | * | 11/1994 | Yap .............................. 239/553.5 |
| 6,558,614 | B1 | | 5/2003 | Fritz |
| 6,725,690 | B2 | | 4/2004 | Enomoto et al. |
| 2002/0062659 | A1 | | 5/2002 | Enomoto et al. |
| 2004/0065120 | A1 | | 4/2004 | Uchiyama et al. |

(Continued)

FOREIGN PATENT DOCUMENTS

| JP | 1773359 C | 8/1987 |
|---|---|---|
| JP | 63-115041 U | 7/1988 |

(Continued)

OTHER PUBLICATIONS

Korean Office Action dated Dec. 24, 2010, issued in corresponding Korean Patent Application No. 10-2008-0119263.

(Continued)

*Primary Examiner* — Steven McAllister
*Assistant Examiner* — Avinash Savani
(74) *Attorney, Agent, or Firm* — Westerman, Hattori, Daniels & Adrian, LLP

(57) ABSTRACT

A burner for fabricating an optical fiber preform, which can suppress the adhesion and deposition of glass particles to the front end of the burner without enlarging the burner diameter, is provided. The burner has a first tube, a second tube and a third tube coaxially arranged and define a glass raw material gas port, a sealing gas port, and a burnable gas port by the front end portions thereof, and a plurality of small diameter nozzles arranged between the second tube and the third tube, each of the nozzles arranged on a concentric circle relative to the glass raw material gas port and defines a combustion assisting gas port by the front end portion thereof, the front end portion of the second tube protrudes ahead of that of the first tube, and the front end portion of the third tube protrudes ahead of those of the second tube and each of the nozzles.

4 Claims, 4 Drawing Sheets

(56) References Cited

U.S. PATENT DOCUMENTS

| | | | |
|---|---|---|---|
| 2005/0223750 A1* | 10/2005 | Nutini et al. | 65/413 |
| 2006/0130531 A1* | 6/2006 | Kang et al. | 65/531 |
| 2006/0137404 A1* | 6/2006 | Nunome et al. | 65/421 |
| 2007/0254251 A1 | 11/2007 | Cao et al. | |

FOREIGN PATENT DOCUMENTS

| | | |
|---|---|---|
| JP | 1257147 A | 10/1989 |
| JP | 05-323130 A | 12/1993 |
| JP | 2003-165737 A | 6/2003 |
| JP | 2003-206154 A | 7/2003 |
| JP | 2003-212555 A | 7/2003 |
| JP | 2003-226544 A | 8/2003 |
| JP | 2003-277099 A | 10/2003 |
| JP | 3543537 B2 | 7/2004 |
| JP | 2004-331440 A | 11/2004 |
| JP | 3591330 B2 | 11/2004 |
| JP | 3653902 B2 | 6/2005 |
| JP | 3744350 B2 | 2/2006 |
| JP | 2006-182624 A | 7/2006 |
| JP | 2008-063179 A | 3/2008 |
| KR | 10-0567155 A | 4/2006 |

OTHER PUBLICATIONS

European Search Report dated Sep. 8, 2011, issued in corresponding European Patent Application No. 09002871.3.

Official Notice of Rejection datd Jul. 20, 2012, issued in corresponding Japanese Patent Application No. 2009-028656, with English translation (7 pages).

* cited by examiner

BURNER FOR FABRICATING OPTICAL FIBER PREFORM

This application claims the benefit of Japanese Patent Application Nos. 2008-046851, filed Feb. 27, 2008 and 2009-028656 filed Feb. 10, 2009 which are hereby incorporated by reference herein in their entirety.

BACKGROUND OF THE INVENTION

1. Field of the Invention

The present invention relates to a burner used when fabricating an optical fiber perform by hydrolyzing glass raw material gas in flame to generate glass particles and depositing the glass particles on a rotating start rod.

2. Description of the Related Art

Up until now, various methods have been proposed for fabricating optical fiber preforms. Among these methods, an Outside Vapor Phase Deposition (OVD) Method), in which glass particles generated in burner flame are adhered and deposited on a rotating start rod while relatively reciprocating the burner and the start rod to synthesize a porous preform and the preform is dehydrated and sintered in an electric furnace, is widely used because the method can make it relatively easy to fabricate an optical fiber perform having a desired refractive index profile and can mass-produce a large-diameter optical fiber perform.

FIG. 1 schematically shows an example of an apparatus for fabricating an optical fiber preform. In FIG. 1, a start rod, on which glass particles are to be deposited, is constituted by welding a dummy rod 2 at the both ends of a core rod 1. The start rod is held by chucking and rotating mechanisms 4 at both ends thereof. Each of the chucking and rotating mechanisms 4 is mounted on a supporting member 7 and rotates the start rod about the axis thereof. A burner 3 sprays vapor of an optical fiber raw material such as $SiCl_4$ and combustion gas (hydrogen gas and oxygen gas) on the start rod, which is rotated about the axis thereof, while being reciprocated in longitudinal directions of the start rod by a burner moving mechanism 6. As a result, glass particles generated by the hydrolysis in oxyhydrogen flame are deposited on the start rod so that a porous optical fiber preform is formed. Meanwhile, the reference numeral 5 indicates an exhaust hood for the vapor and the combustion gas.

For synthesizing glass particles and depositing the glass particles on a start rod, a burner having a coaxial multiple tube structure has been conventionally used. However, in the burner having such structure, sufficient synthetic efficiency of the glass particles can not be obtained, because a glass raw material gas, a burnable gas and a combustion assisting gas are not sufficiently mixed with each other. As the result, the yield has not been improved and a high speed synthesis of a porous optical fiber preform has been difficult.

In order to solve the problem, Japanese Patent No. 1773359 (correspondent to European Patent No. 0237183 and U.S. Pat. No. 4,810,189) proposed a multi-nozzle type burner, in which small diameter combustion assisting gas nozzles (hereinafter, abbreviated as small diameter nozzle) are arranged in a burnable gas port so as to surround the central raw material gas port.

For the burner of this type, some methods for further improving the deposition efficiency have been proposed. For example, Japanese Patent Application Laying-Open Nos. 2003-206154, 2004-331440 and 2006-182624 (corresponding to U.S. Patent Application Laying-Open No. 2006137404), and Japanese Patent No. 3744350 disclose the arrangements of the small diameter nozzles; Japanese Patent Application Laying-Open No. H05-323130 (1993), Japanese Patent No. 3543537 and Japanese Patent Application Laying-Open No. 2003-226544 disclose mechanisms for optimizing focal length of the small diameter nozzle; and Japanese Patent No. 3591330, Japanese Patent Application Laying-Open Nos. 2003-165737 and 2003-212555, and Japanese Patent No. 3653902 disclose mechanisms for optimizing gas flow rate and gas linear velocity.

Conventionally, there has been a problem that glass particles being floated by the disturbance of gas flow easily adhere to the front end of eject ports located outside a glass raw material gas port to close the burner front end when the adhesion proceeds. Particularly, in a burner provided with the small diameter nozzles, a plurality of small diameter nozzles are arranged in the portion near the central glass raw material gas port, and thus the burner is constructed such that glass particles adhere easily to the front end of the small diameter nozzle.

In order to overcome the problem, the front end of the central glass raw material gas port and the front end of the small diameter nozzles are set apart from each other in a radial direction so as to avoid the adhesion of glass particles. However, the diameter of the burnable gas port covering the small diameter nozzles must be made large, which leads to the enlargement of a flow path area to generate such new problem as the increase in a necessary flow rate of the burnable gas. In addition, the enlargement of a burner in size makes the setting of the burner in a deposition apparatus difficult.

SUMMARY OF THE INVENTION

An object of the present invention is to provide a burner for fabricating an optical fiber preform capable of suppressing the adhesion and deposition of glass particles to the burner front end without enlarging the burner diameter.

The present invention provides a burner for fabricating an optical fiber preform, including a first tube provided with a front end configured to define a glass raw material port for ejecting a glass raw material gas, a second tube coaxially arranged outside the first tube and provided with a front end configured to define a sealing gas port for ejecting a sealing gas together with the front end portion of the first tube, a third tube coaxially arranged outside the second tube and provided with a front end configured to define a burnable gas port for ejecting a burnable gas together with the front end portion of the second tube, and a plurality of small diameter nozzles arranged in a space formed between the second tube and the third tube; each of the nozzles having a front end arranged on a concentric circle relative to the glass raw material gas port, and configured to define a combustion assisting gas port for ejecting a combustion assisting gas, wherein the front end portion of the second tube protrudes ahead of the front end portion of the first tube in a gas ejecting direction, and the front end portion of the third tube protrudes ahead of the front end portion of the second tube and the front end portion of each of the nozzles in the gas ejecting direction.

Preferably, the front end portion of the small diameter nozzle may be arranged at approximately the same position as the front end portion of the second tube in the gas ejecting direction.

Alternatively, the front end portion of the small diameter nozzle may protrude ahead of the front end portion of the second tube in the gas ejecting direction.

According to the present invention, the adhesion and deposition of glass particles to the front end portion of a burner can be suppressed without enlarging the burner diameter.

DESCRIPTION OF THE EMBODIMENTS

Figure 2:
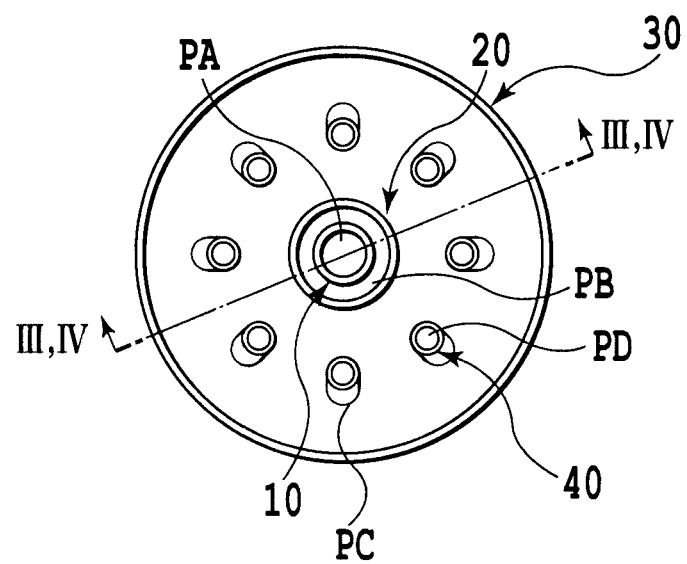
FIG. 2 is a schematic front view showing a construction of the front end portion of a burner having a coaxial multiple tube structure and provided with a plurality of small diameter nozzles.
Figure 3:
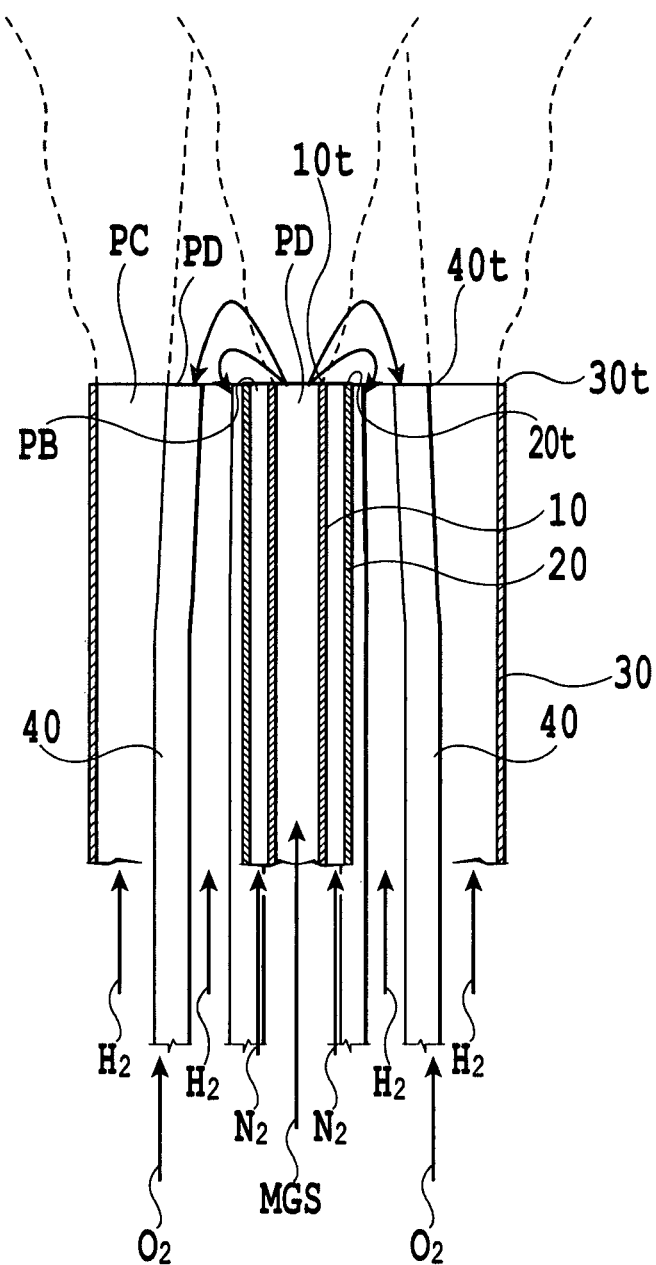
FIG. 3 is a schematic cross-sectional view of the conventional burner, which illustrates the state of gas flow at the front end portion.

Usually, the deposition of glass particles is performed by a burner having the construction as shown in FIGS. 2 and 3. The burner has a first tube 10, a second tube 20 that is coaxially arranged outside the first tube 10, a third tube 30 that is coaxially arranged outside the second tube 20, and a plurality of small diameter nozzles 40 arranged in a space between the second tube 20 and the third tube 30, wherein a front end portion 10t of the first tube 10 defines a glass raw material gas port PA, the front end portion 10t of the first tube 10 and a front end portion 20t of the second tube 20 define a sealing gas port PB that ejects a sealing gas, the front end portion 20t of the second tube 20 and a front end portion 30t of the third tube 30 define a burnable gas port PC, and a front end portion 40t of the small diameter nozzle defines a combustion assisting gas port PD. Each of the plurality of the combustion assisting gas ports PD has the same focal length and is arranged in a circular line on a concentric circle relative to the glass raw material gas port PA. Here, the plurality of the combustion assisting gas ports PD can be arranged in a plurality of circular lines including two or more circular lines instead of one circular line.

In the above-described burner, the glass raw material gas port PA ejects a mixed gas MGS of a glass raw material such as $SiCl_4$ and a combustion assisting gas $O_2$, the sealing gas port PB ejects a sealing gas $N_2$, the burnable gas port PC ejects a burnable gas $H_2$, and the combustion assisting gas port PD ejects a combustion assisting gas $O_2$.

After being ejected from respective ports PA to PD, respective reactive gases are released from the pressure in bursts and diffuse with disturbance. On this occasion, as the disturbance increases and the gas flow is getting diffused, glass particles generated due to the hydrolysis reaction in the flame easily adhere and deposit on the front end portion 20t of the second tube 20 and the front end portion 40t of the small diameter nozzle arranged outside the glass raw material gas port PA.

Figure 4:
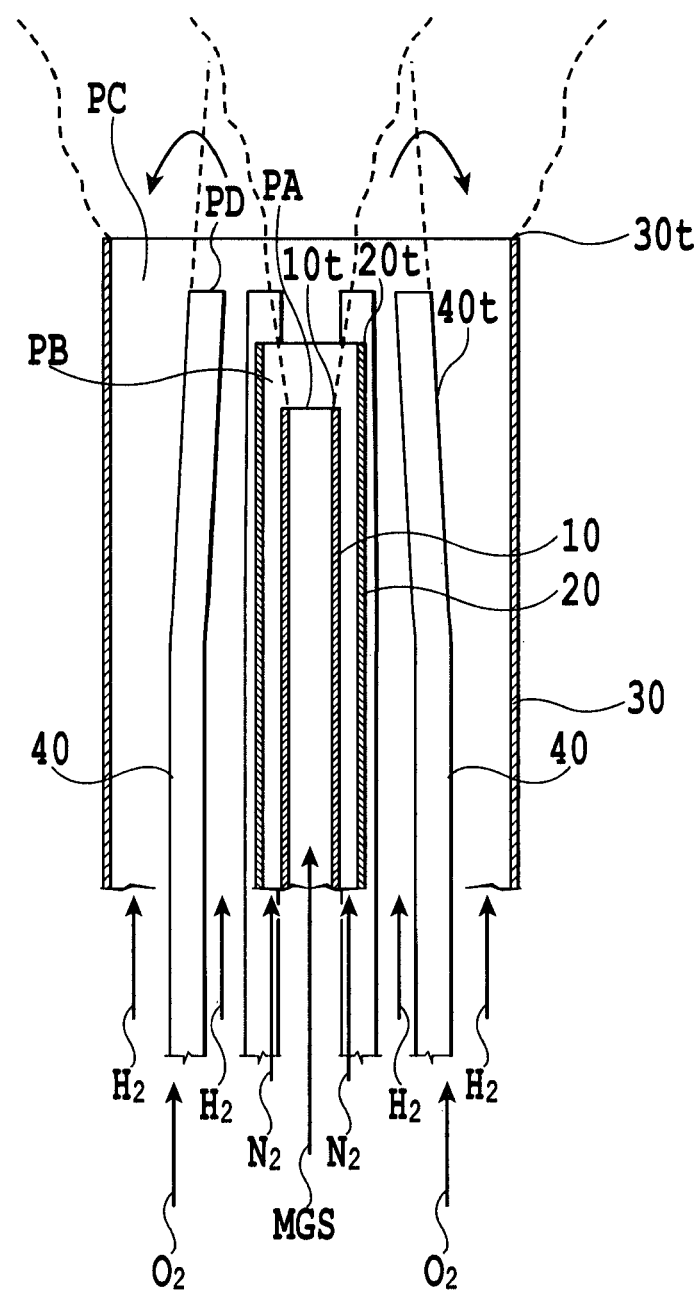
FIG. 4 is a schematic cross-sectional view of the burner according to an embodiment of the present invention, which illustrates the state of gas flow at the front end portion of the burner.

A burner according to the present invention has, for example, as shown in FIG. 4, the front end portion 20t of the second tube 20 protruding ahead of the front end portion 10t of the first tube 10, and the front end portion 30t of the third tube 30 protruding ahead of the front end portion 20t of the second tube 20 and the front end portion 40t of the small diameter nozzle 40. This burner has a front view as shown in FIG. 2.

The burner according to the present invention can maintain a pressured state to some extent by gases from gas ports PB, PC and PD arranged outside the port PA, even after the glass raw material gas is ejected from the glass raw material gas port PA, thereby the suppressing the disturbance and diffusion of the glass particle flow. This makes it possible to prevent glass particles from approaching the front end portion 20t of the second tube 20 and the front end portion 40t of the small diameter nozzle 40 arranged outside the glass raw material gas port PA. As the result, it becomes possible to suppress the adhesion and deposition of glass particles on the front end portion 20t of the second tube 20 and the front end portion 40t of the small diameter nozzle 40.

Figure 1:
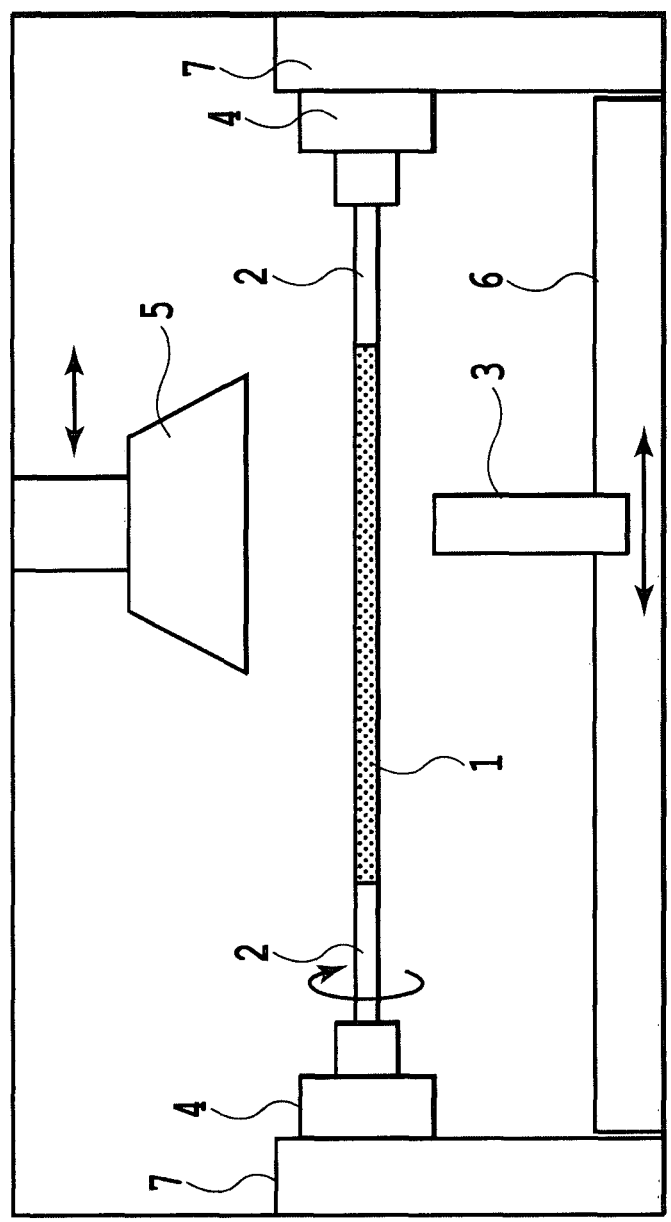
FIG. 1 is a schematic view showing an apparatus for fabricating a porous glass preform by the Outside Vapor Phase Deposition (OVD) Method.

Using the apparatus as shown in FIG. 1, by the OVD method, glass particles were deposited on a start rod formed by welding a dummy rod having an outside diameter of 50 mm to both ends of a core rod having an outside diameter of 50 mm and a length of 2000 mm with a burner according to the present invention and having a coaxially triple tube structure as shown in FIGS. 2 and 4, to fabricate an optical fiber preform.

The burner used had a structure as shown in FIG. 4, which had 8 small diameter nozzles 40 wherein the focal length of the combustion assisting gas port PD of respective small diameter nozzles 40 was set to 150 mm.

To the first tube 10 of the burner, $SiCl_4$ as a glass raw material in a flow rate of 10 L/min and a combustion assisting gas $O_2$ in a flow rate of 20 L/min were supplied. To the passage formed between the first tube 10 and the second tube 20, a sealing gas $N_2$ was supplied in a flow rate of 4 L/min. To the passage formed between the second tube 20 and the third tube 30, a burnable gas $H_2$ was supplied in a flow rate of 170 L/min. Further, to respective small diameter nozzles 40, a combustion assisting gas $O_2$ was supplied in a flow rate of 16 L/min. As a result, 100 kg of glass particles were deposited on the start rod. The type and flow amounts of gases were supplied to the burner are collectively listed in Table 1.

TABLE 1

| | type of gas | flow rate (L/min) |
|---|---|---|
| first tube 10 | $SiCl_4$ | 10 |
| | $O_2$ | 20 |
| between first tube 10 and second tube 20 | sealing gas $N_2$ | 4 |
| small diameter nozzle 40 | $O_2$ | 16 |
| between second tube 20 and third tube 30 | $H_2$ | 170 |

When fabricating the optical fiber preform, five kinds of burners, in which the protruding amounts of the front end portion 20t of the second tube 20, the front end portion 30t of the third tube 30 and the front end portion 40t of the small diameter nozzle 40 were varied relative to the front end portion 10t of the first tube 10 defining the glass raw material gas eject port PA, were used to deposit glass particles. The protruding conditions and the deposition results are collectively listed in Table 2.

TABLE 2

| | protrusion amount (mm) | | | | | |
|---|---|---|---|---|---|---|
| | condition 1 | condition 2 | condition 3 | condition 4 | condition 5 | condition 6 |
| first tube 10 | 0 | 0 | 0 | 0 | 0 | 0 |
| second tube 20 | 0 | 0 | 2 | 2 | 2 | 2 |
| Small diameter nozzle 40 | 0 | 0 | 2 | 2 | 4 | 4 |
| third tube 30 | 0 | 2 | 2 | 4 | 6 | 8 |
| first lot | closed at 45 kg | with adherence | closed at 90 kg | no problem | no problem | overheated |
| second lot | x | closed at 60 kg | x | same as above | same as above | x |
| third lot | x | x | x | same as above | same as above | x |
| fourth lot | x | x | x | same as above | same as above | x |
| fifth lot | x | x | x | same as above | same as above | x |

In cases of condition 1 in Table 2, the protrusion amount of the front end portion 30t of the third tube 30 was 0 mm. Here, large amounts of glass particles adhered to the front end portion 20t of the second tube 20 and the front end portion 40t of the small diameter nozzle 40 thereby closing the front end of the burner when glass particles of 45 kg were deposited. Therefore, the deposition of glass particles was interrupted.

In cases of condition 2, in which the protrusion amount of the front end portion 30t of the third tube 30 was 2 mm. Here, although the adhesion of glass particles to the front end portion 40t of the small diameter nozzle 40 decreased, a large amount of glass particles adhered to the front end portion 20t of the second tube 20 to close the front end of the burner when glass particles of 60 kg were deposited to a second optical fiber perform. Therefore, the deposition of glass particles was interrupted.

In cases of condition 3, the protrusion amount of each of the front end portions of the second tube 20, small diameter nozzle 40 and third tube 30 were all set to 2 mm relative to the front end portion 10t of the first tube 10. Here, although the adhesion of glass particles to the second tube 20 was eliminated, there existed the adhesion to the front end of the small diameter nozzle 40 to close the burner front end when glass particles of 90 kg were deposited on a first optical fiber perform. Therefore, the deposition of glass particles was interrupted.

In respective cases of conditions 4 and 5, the front end portion 20t of the second tube 20 protruded ahead relative to the front end portion 10t of the first tube 10. The front end portion 30t of the third tube 30 protruded ahead relative to the front end portion 20t of the second tube 20 and the front end portion 40t of the small diameter nozzle 40. In the case of condition 4, the front end portion 20t of the second tube 20 and front end portion 40t of the small diameter nozzle 40 protruded in the same amount. In the case of condition 5, the front end portion 40t of the small diameter nozzle 40 protruded ahead of the front end portion 20t of the second tube 20.

In these conditions 4 and 5, no glass particle adhered to the burner front end, thereby making it possible to manufacture five optical fiber preforms without trouble.

In cases of condition 6, in which the protrusion amount of the front end portion 30t of the third tube 30 relative to the front end portion 10t of the first tube 10 was set greater than that in condition 5, when glass particles were deposited to a first optical fiber perform, the front end portion of the burner was overheated by the burner flame thereof, so that it became impossible to fabricate the optical fiber preform.

According to the present invention, it is possible to suppress the closure of the front end portion of the burner by detrimental deposit when fabricating the optical fiber preform, and accordingly the productivity can be improved by the present invention.

Having described preferred embodiments of the invention with reference to the accompanying drawings, it is to be understood that the invention is not limited to the specific embodiments and examples, and that various changes and modifications may be effected therein by those skilled in the art without departing from the scope or spirit of the invention as defined by appended claims.

What is claimed is:

1. A burner for fabricating an optical fiber perform, comprising:
   a first tube having a front end configured to define a glass raw material port for ejecting a glass raw material gas;
   a second tube coaxially arranged outside the first tube and having a front end portion configured to define a sealing gas port for ejecting a sealing gas together with the front end portion of the first tube;
   a third tube coaxially arranged outside the second tube and provided with a front end portion configured to define a burnable gas port for ejecting a burnable gas together with the front end portion of the second tube; and
   a plurality of small diameter nozzles arranged in a space formed between the second tube and the third tube; each of the nozzles having a front end arranged on a concentric circle relative to the glass raw material gas port, and configured to define a combustion assisting gas port for ejecting a combustion assisting gas, each of the plurality of the combustion assisting gas ports having the same focal length;

wherein
the front end portion of the second tube protrudes ahead of the front end portion of the first tube in a gas ejecting direction, and the front end portion of the third tube protrudes ahead of the front end portion of the second tube and the front end portion of each of the nozzles in the gas ejecting direction, wherein the plurality of small diameter nozzles are disposed in an annular channel for the burnable gas which is defined by the second and third tubes.

2. The burner for fabricating an optical fiber preform according to claim 1, wherein the front end portion of each of the small diameter nozzles is arranged at substantially the same position as the front end portion of the second tube in the gas ejecting direction.

3. The burner for fabricating an optical fiber preform according to claim 1, wherein the front end portion of each of the small diameter nozzles protrudes ahead of the front end portion of the second tube in the gas ejecting direction.

4. The burner for fabricating an optical fiber preform according to claim 1, wherein the front end portion of the third tube is positioned relative to the first tube at a position for preventing a front end of the burner from being closed by deposition of glass particles and being overheated by burner flame.

* * * * *